(12) United States Patent
Malmin et al.

(10) Patent No.: US 12,359,713 B2
(45) Date of Patent: Jul. 15, 2025

(54) SPROCKET ASSEMBLY, AND A METHOD FOR ASSEMBLING OR REPLACING SAME

(71) Applicant: Cubility AS, Sandnes (NO)

(72) Inventors: Arne Malmin, Sandnes (NO); Arne Thomas Haaland, Sandnes (NO)

(73) Assignee: Cubility AS, Sandnes (NO)

( * ) Notice: Subject to any disclaimer, the term of this patent is extended or adjusted under 35 U.S.C. 154(b) by 0 days.

(21) Appl. No.: 18/717,042

(22) PCT Filed: Sep. 16, 2022

(86) PCT No.: PCT/NO2022/050216
§ 371 (c)(1),
(2) Date: Jun. 6, 2024

(87) PCT Pub. No.: WO2023/121469
PCT Pub. Date: Jun. 29, 2023

(65) Prior Publication Data
US 2025/0035199 A1   Jan. 30, 2025

(30) Foreign Application Priority Data
Dec. 22, 2021 (NO) .................................. 20211571

(51) Int. Cl.
*F16H 55/12* (2006.01)
*B65G 23/06* (2006.01)
*F16H 55/30* (2006.01)

(52) U.S. Cl.
CPC ............ *F16H 55/12* (2013.01); *B65G 23/06* (2013.01); *F16H 55/30* (2013.01)

(58) Field of Classification Search
CPC ........... F16H 55/30; F16H 55/12; F16H 55/46
USPC ...................................................... 474/95, 96
See application file for complete search history.

(56) References Cited

U.S. PATENT DOCUMENTS

| | | | | |
|---|---|---|---|---|
| 302,218 A | * | 7/1884 | Zitzewitz | F16H 55/30 474/95 |
| 360,645 A | * | 4/1887 | Baute | F16H 55/30 474/96 |
| 403,116 A | * | 5/1889 | Lawson | F16H 55/30 474/96 |

(Continued)

FOREIGN PATENT DOCUMENTS

| | | |
|---|---|---|
| EP | 1719718 A2 | 11/2006 |
| EP | 3135568 A1 | 3/2017 |
| WO | 2018024307 A2 | 2/2018 |

OTHER PUBLICATIONS

Search Report for Corresponding Norwegian Application No. 20211571, dated Jul. 14, 2022.

(Continued)

*Primary Examiner* — Henry Y Liu
(74) *Attorney, Agent, or Firm* — Andrus Intellectual Property Law, LLP

(57) ABSTRACT

A sprocket assembly and a method for assembling or replacing same. The sprocket assembly has a hub adapted to be mounted on a shaft, and a sprocket collar having a peripheral surface and an inner surface. The sprocket collar has a split extending between the inner surface and the peripheral surface and is releasably interlocked with the hub. The sprocket collar is made of a flexible material so that the split is widenable by pulling two sides of the split.

17 Claims, 2 Drawing Sheets

(56) References Cited

U.S. PATENT DOCUMENTS

| | | | | | |
|---|---|---|---|---|---|
| 405,352 | A | * | 6/1889 | Gilbert | F16H 55/30 474/95 |
| 462,363 | A | * | 11/1891 | Murray | F16H 55/30 474/96 |
| 536,696 | A | * | 4/1895 | Hirsh | F16H 55/12 235/31 R |
| 1,325,778 | A | * | 12/1919 | Borden | F16H 55/12 74/448 |
| 1,391,719 | A | * | 9/1921 | Conyngham | F16H 55/12 474/95 |
| 1,613,920 | A | * | 1/1927 | Bahan | F16H 55/12 74/451 |
| 1,687,987 | A | * | 10/1928 | Moon | F16H 55/12 74/446 |
| 1,721,066 | A | * | 7/1929 | Bowen | F16H 55/44 474/96 |
| 2,230,902 | A | * | 2/1941 | Overbey | F16H 55/12 74/448 |
| 2,382,740 | A | * | 8/1945 | Noffsinger | F16H 55/30 474/96 |
| 3,069,922 | A | * | 12/1962 | Harvey | F16H 55/30 74/448 |
| 3,082,637 | A | * | 3/1963 | Paxton | F16H 55/30 74/450 |
| 3,083,585 | A | * | 4/1963 | Dawe | F16H 55/30 474/96 |
| 3,159,047 | A | * | 12/1964 | Dable | F16H 55/12 474/96 |
| 3,168,836 | A | * | 2/1965 | Miltana | F16H 55/12 474/902 |
| 4,031,769 | A | * | 6/1977 | Kassing | F16H 55/12 74/448 |
| 4,043,214 | A | * | 8/1977 | Westlake | F16H 55/12 74/447 |
| 4,506,559 | A | * | 3/1985 | Francke | F16H 55/46 74/439 |
| 4,708,698 | A | * | 11/1987 | Ziegelmeyer | B65G 23/06 464/41 |
| 5,057,058 | A | * | 10/1991 | Crudup | F16H 55/46 474/95 |
| 5,131,890 | A | * | 7/1992 | Hertel | F16C 33/201 474/152 |
| 5,322,478 | A | * | 6/1994 | Bos | B65G 23/06 474/96 |
| 5,518,109 | A | * | 5/1996 | Dailey | B65G 23/06 403/356 |
| 5,702,316 | A | * | 12/1997 | Cole | F16H 55/12 474/96 |
| 5,833,562 | A | * | 11/1998 | Walker, Sr. | F16H 55/46 474/902 |
| 6,074,316 | A | * | 6/2000 | Murrietta, Sr. | F16H 55/30 474/96 |
| 6,086,495 | A | * | 7/2000 | Stebnicki | F16H 55/12 474/96 |
| 6,146,299 | A | * | 11/2000 | Harvey | F16H 55/46 474/95 |
| 7,556,143 | B2 | * | 7/2009 | Crooks | F16D 1/0876 198/779 |
| 7,819,766 | B2 | * | 10/2010 | Kennedy | F16D 1/076 403/197 |
| 8,151,663 | B2 | * | 4/2012 | Beutler | F16H 55/12 74/411 |
| 8,267,818 | B2 | * | 9/2012 | Curley | F16H 55/12 474/96 |
| 10,238,035 | B2 | * | 3/2019 | Walters | F16H 57/035 |
| 10,371,243 | B2 | * | 8/2019 | Modrzejewski | F16H 55/06 |
| 10,927,939 | B1 | * | 2/2021 | Hoban | F16H 55/30 |
| 11,098,797 | B2 | * | 8/2021 | Feuerborn | F16H 55/06 |
| 11,292,555 | B2 | * | 4/2022 | Akanishi | F16H 55/12 |
| 11,384,828 | B2 | * | 7/2022 | Hall | F16D 1/104 |
| 11,719,322 | B2 | * | 8/2023 | Todderud | F16H 55/30 474/165 |
| 11,867,274 | B2 | * | 1/2024 | Hobbs | F16H 55/10 |
| 12,031,619 | B2 | * | 7/2024 | Yuan | F16H 55/30 |
| 12,049,947 | B2 | * | 7/2024 | Pease | F16H 55/12 |
| 2007/0161443 | A1 | * | 7/2007 | Krisl | F16H 55/30 474/95 |
| 2007/0270260 | A1 | * | 11/2007 | Latham | F16H 55/30 474/152 |
| 2009/0044650 | A1 | * | 2/2009 | Beutler | F16H 55/12 74/447 |
| 2010/0160097 | A1 | * | 6/2010 | Van Der Ende | F16H 55/12 474/95 |
| 2010/0273592 | A1 | * | 10/2010 | Curley | F16H 55/12 474/152 |
| 2016/0040773 | A1 | * | 2/2016 | Sturgin | F16H 57/0025 74/434 |
| 2016/0363206 | A1 | * | 12/2016 | Modrzejewski | F16H 55/06 |
| 2020/0040979 | A1 | * | 2/2020 | Akanishi | B62M 9/00 |
| 2020/0141479 | A1 | * | 5/2020 | Feuerborn | F16H 55/48 |
| 2021/0131550 | A1 | * | 5/2021 | Hall | F16D 1/0817 |
| 2021/0148446 | A1 | * | 5/2021 | Todderud | F16H 55/12 |
| 2021/0277986 | A1 | * | 9/2021 | Hobbs | F16H 55/30 |
| 2023/0035809 | A1 | * | 2/2023 | Pease | F16H 55/171 |
| 2023/0167891 | A1 | * | 6/2023 | Yuan | F16H 55/171 474/152 |
| 2025/0155010 | A1 | * | 5/2025 | Yuan | F16H 55/12 |

OTHER PUBLICATIONS

International Search Report and the Written Opinion for Corresponding Application No. PCT/NO2022/050216, dated Nov. 3, 2022.
Response to the Written Opinion for Application No. PCT/NO2022/050216, dated Mar. 2, 2023.
Second Written Opinion for Application No. PCT/NO2022/050216, dated Oct. 26, 2023.
International Preliminary Report on Patentability for Corresponding Application No. PCT/NO2022/050216, dated Jan. 3, 2024.

* cited by examiner

SPROCKET ASSEMBLY, AND A METHOD FOR ASSEMBLING OR REPLACING SAME

CROSS-REFERENCE TO RELATED APPLICATIONS

This application is the U.S. national stage application of International Application No. PCT/NO2022/050216, filed Sep. 16, 2022, which international application was published on Jun. 29, 2023, as WO 2023/121469 in the English language. The International Application claims priority to Norwegian Patent Application No. 20211571, filed Dec. 22, 2021. The international application and Norwegian application are both incorporated herein by reference, in their entirety.

FIELD

The invention relates to a sprocket assembly, and a method for assembling or replacing same. More specifically, the invention relates to sprocket assembly for mounting on a shaft.

BACKGROUND

In systems using sprockets driven chains and belts, a common problem is that the teeth of the sprockets become worn out or damaged. Replacing the sprockets is burdensome and time-consuming, especially where several sprockets are installed onto a common drive shaft. The shaft must be dismantled from the apparatus carrying the shaft, and one or more sprockets must be removed to access the one or more being damaged. As the one or more damaged sprocket has been replaced, the other sprockets must be re-installed, and the shaft must be re-mounted.

In addition to costs related to the replacement material and labour, the replacement of sprockets also represents a large cost due to downtime of the system.

Document WO2018024307A2 describes a multipart sprocket wheel adapted to engage modular belt modules in a conveyor belt. The multipart sprocket wheel includes one or more adapter members for engaging a conveyor drive axle and two or more periphery elements for surrounding the adapter members. However, each periphery element requires means for being fastened to an adjacent periphery element such that the two or more periphery elements outer edges form a full circle.

Document US 2010273592 A1 describes a multipart sprocket. The sprocket includes a hub shaped to fit around an axially extending shaft and includes a plurality of hub portions. Further, the sprocket includes a material-interfacing plate including several plate portions. The plate portions are shaped to fit around the hub.

SUMMARY

The invention has for its objective to remedy or to reduce at least one of the drawbacks of the prior art, or at least provide a useful alternative to prior art, by providing a sprocket assembly with a replaceable set of teeth.

The objective is achieved through features which are specified in the description below and in the claims that follow.

The invention is defined by the independent patent claims. The dependent claims define advantageous embodiments of the invention.

In a first aspect the invention relates to a sprocket assembly comprising a hub adapted to be mounted on a shaft and a sprocket collar releasably interlocked with the hub. The sprocket collar comprises a peripheral surface and an inner surface, and a split extending between the inner surface and the peripheral surface. Also, the sprocket collar is in one piece and made of a flexible material so that the split is widenable by pulling two sides of the split.

The effects of the features of the sprocket assembly in accordance with the invention are as follows. First of all, a key feature of the sprocket assembly is the releasable interlocking between the sprocket collar and the hub. The two parts can thus be easily assembled and disassembled without removing the hub from the shaft. The hub can therefore be fixed onto the shaft and only the sprocket collar may be replaced if needed. The sprocket collar can be removed by sliding the sprocket collar in the axial direction, off the hub. Likewise, a replacement sprocket collar can be slidably inserted onto the hub in the axial direction. Secondly, the split extending between the inner surface and the peripheral surface of the sprocket collar simplifies further the assembly and disassembly process of the sprocket assembly. By expanding the split, the sprocket collar can be brought onto the shaft so that the sprocket collar surrounds a portion of the shaft. In this way, the sprocket collar can be mounted on and off the shaft without the need of sliding the sprocket collar off an end of the shaft. This also removes the need for dismantling the shaft to remove the sprocket collar off the end of the shaft if the shaft is fastened on both ends. Replacing the sprocket collar in this way is a fast and easy method for replacing the whole set of teeth of the sprocket assembly in one single operation. The effect of the split in the sprocket collar is especially advantageous if several sprocket assemblies are mounted on the same shaft.

In an embodiment of the sprocket assembly according to the invention the sprocket assembly may comprise an alignment means for preventing axial movement between the hub and the sprocket collar. The advantage of the alignment means is that it prevents the sprocket collar to slide off the hub in operational use.

The alignment means may comprise at least one disk adapted to be mounted on the shaft. The at least one disk may be releasably connectable to the hub and the sprocket collar. This represents an easy way of ensuring the axial alignment of the hub and the sprocket collar.

The at least one disk may comprise at least two disc portions. This would facilitate the removal of the disk from the shaft. It may be easier to remove the sprocket collar from the hub when the disk is completely removed from the shaft.

In an embodiment of the sprocket assembly according to the invention the sprocket assembly may comprise mating engagement means configured for radially interlocking the hub with the sprocket collar. This prevents radial movement between the sprocket collar and the hub.

In an embodiment of the sprocket assembly according to the invention, one of the hub and the sprocket collar is provided with at least one recess and the other one of the hub and the sprocket collar is provided with at least one protrusion. The at least one protrusion is complementary to the at least one recess. The at least one protrusion comprises a neck and a head, wherein the neck is smaller than the head. The recess and the protrusion are in this way radially interlocking the hub with the sprocket collar and preventing relative radial movement between the sprocket collar and the hub.

The peripheral surface of the sprocket collar may comprise a plurality of teeth. The teeth can engage with corresponding engagement means on a body to transmit rotational motion to said body.

The hub may comprise locking means for engaging complementary locking means of the shaft. The engagement of the complementary locking means may prevent tangential and axial movement between the hub and the shaft.

In a second aspect the invention relates to a method for assembling or replacing a sprocket assembly. The method comprises the steps of
  providing a sprocket assembly in accordance with any one of the preceding claims;
  mounting the hub on a shaft;
  expanding the split in the sprocket collar;
  bringing the sprocket collar onto the shaft; and
  interlocking the sprocket collar with the hub.

The method may further comprise the steps:
  releasing the sprocket collar from the hub;
  re-expanding the split in the sprocket collar; and
  bringing the sprocket collar away from the shaft.

The method may further comprise the step of providing a replacement sprocket collar and repeating previous mentioned steps to place the replacement sprocket collar onto the shaft and interlocking the replacement sprocket collar with the hub.

The method may further comprise bringing alignment means into interlocking abutment against at least a portion of the hub and at least a portion of the sprocket collar. The alignment means prevents relative axial movement between the hub and the sprocket collar or the new sprocket collar.

The method may further comprise interlocking the alignment means by securing the alignment means to the hub and to the sprocket collar. Securing the alignment means to both the hub and the sprocket collar would prevent relative movement in both axial and radial directions between the hub and the sprocket collar.

The method may further comprise clamping the hub and the sprocket collar between alignment means arranged on either side of the hub and the sprocket collar.

The method may further comprise engaging a locking means of the hub with a complementary locking means of the shaft.

BRIEF DESCRIPTION OF THE DRAWINGS

In the following is described examples of embodiments illustrated in the accompanying figures, wherein.

DETAILED DESCRIPTION OF THE DRAWINGS

Figure 1:
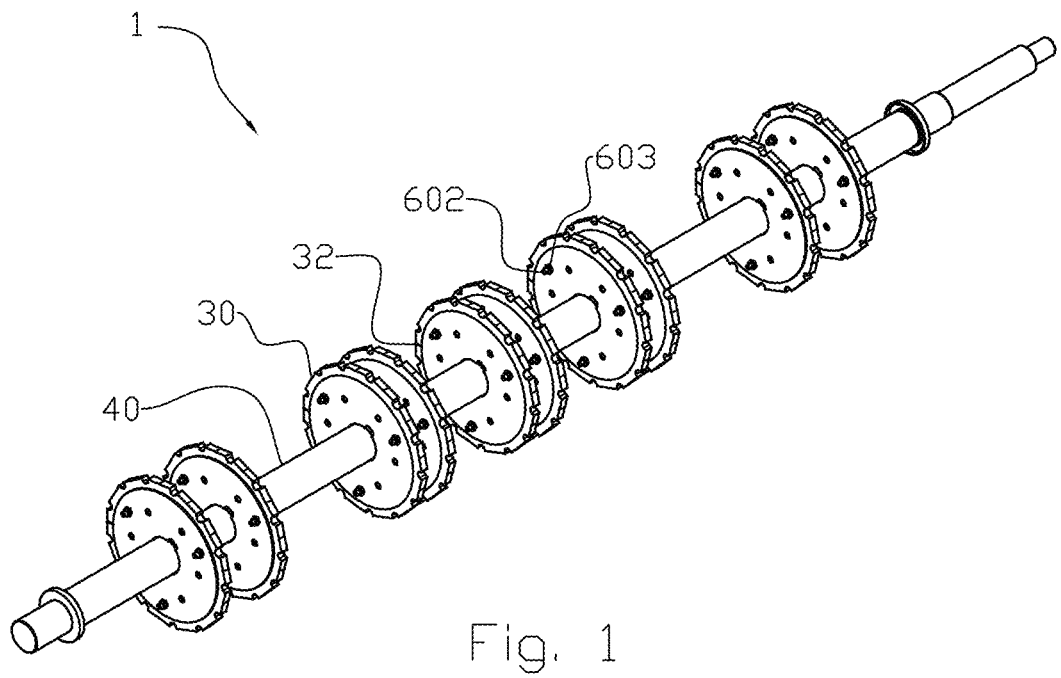
FIG. 1 shows ten sprocket assemblies installed on a shaft.

Any positional indications refer to the position shown in the figures.

In the figures, same or corresponding elements are indicated by same reference numerals. For clarity reasons, some elements may in some of the figures be with-out reference numerals.

A person skilled in the art will understand that the figures are just principal drawings. The relative proportions of individual elements may also be distorted.

In the figures, reference numeral 1 denotes a sprocket assembly according to the invention. The sprocket assembly comprises a hub 20, mounted on a shaft 40. Furthermore, a sprocket collar 30 is releasably interlocked with the hub 20. The sprocket collar 30 comprises a peripheral surface 39 and an inner surface 31, and a split 32 extends from the inner 31 to the peripheral surface 39.

Figure 2:
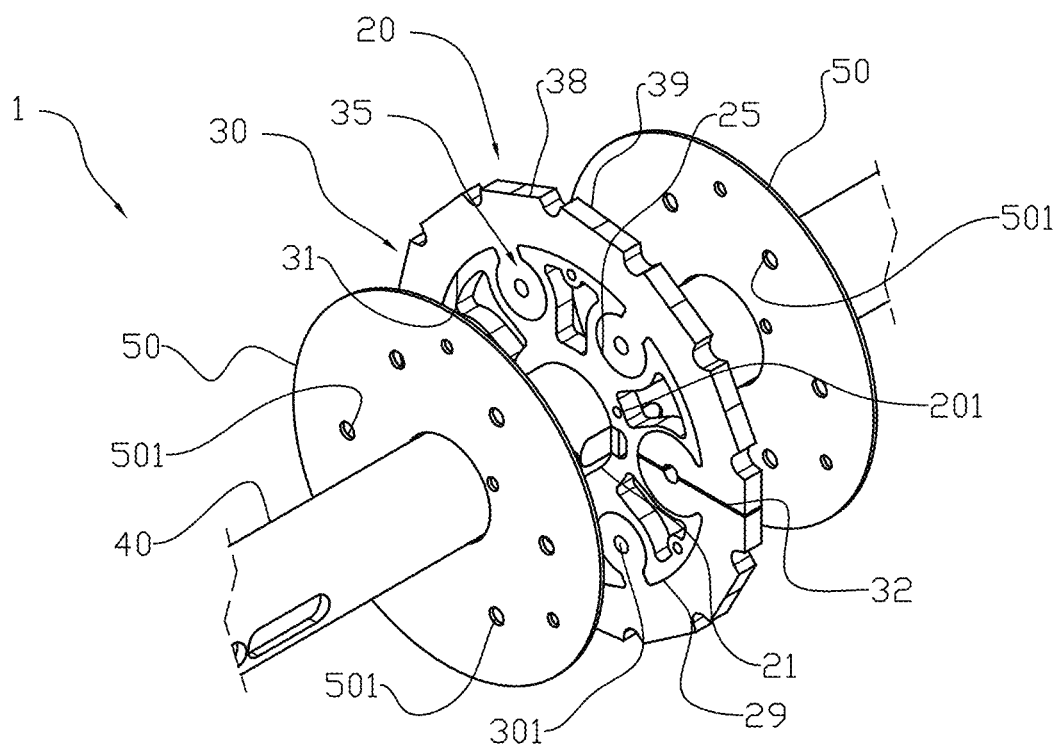
FIG. 2 shows a sprocket assembly from FIG. 1, where the disks have been removed.
Figure 3:
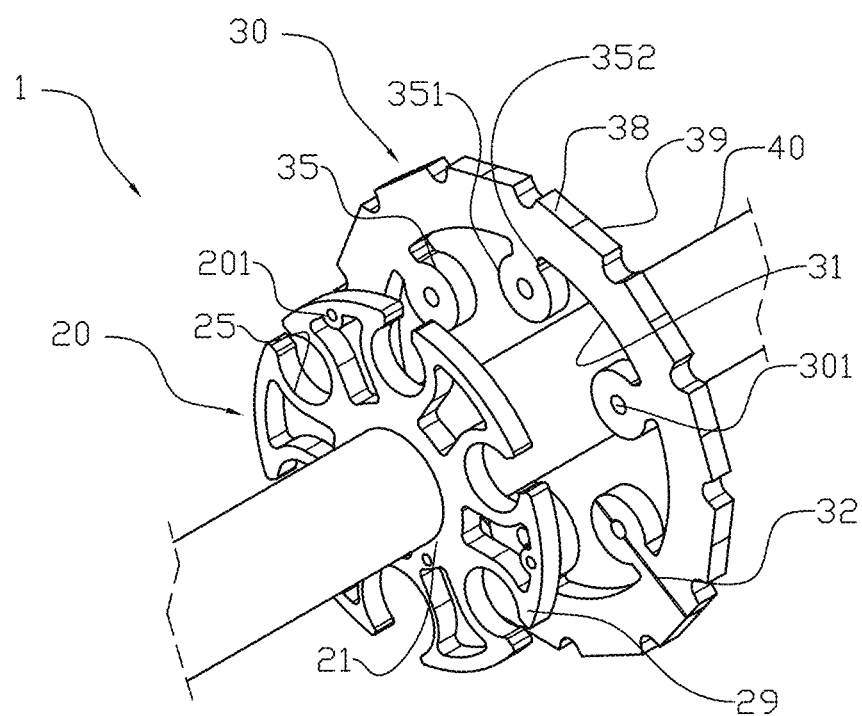
FIG. 3 shows the sprocket assembly from FIG. 2 where the hub and the sprocket collar have been separated.
Figure 4:
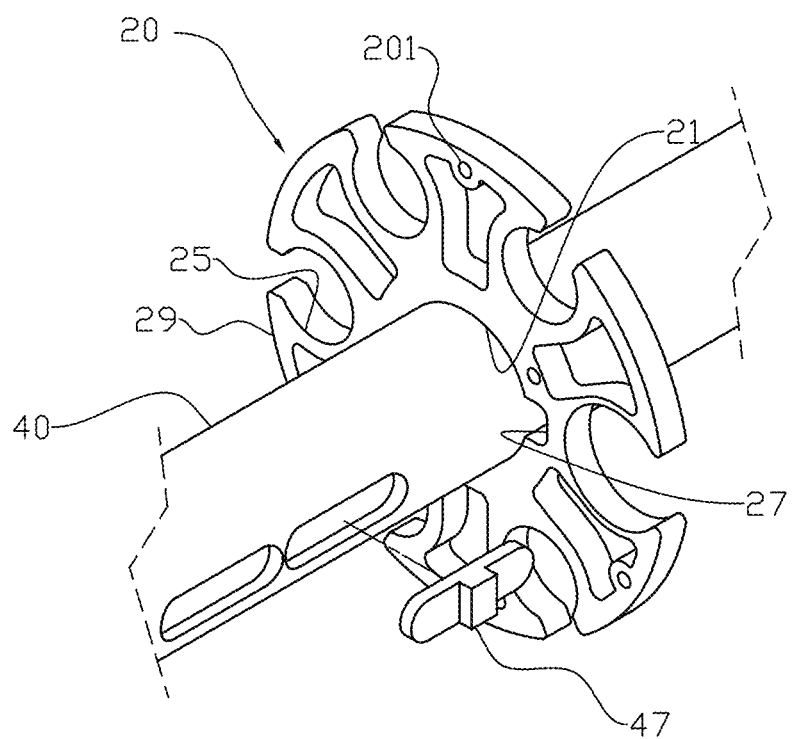
FIG. 4 shows the hub from FIG. 3 on the shaft.

The hub 20 fastened to the shaft 40 can be seen in FIGS. 2, 3, and 4. The hub 20 is typically made from steel and heated before it is positioned on the shaft 40. Upon cooling, the material shrinks and the hub 20 is tightly fitted onto the shaft 40. The hub 20 can also be made of other materials. In the embodiment shown in the figures, the hub 20 comprises a locking means that engages with complementary locking means of the shaft 40. The locking means are here shown as of a groove 27 at the hub's 20 inner surface 21, and a recess on the shaft 40 where a wedge 47 is positioned (FIG. 4). The wedge 47 interlocks with the groove 27, thus preventing tangential movement between the hub 20 and the shaft 40.

The sprocket collar 30 comprises hemispheric protrusions 35 around the inner surface 31. The hub 20 comprises corresponding hemispherical recesses 25 around an outer surface 29 of the hub 20. When the sprocket collar 30 and the hub 20 are put together, the protrusions 35 are registered with the recesses 25, and the sprocket collar 30 and the hub 20 are tangentially interlocked. A rotational movement of the shaft 40 will be transferred to the sprocket collar 30 through rotation of the hub 20.

When assembling the sprocket assembly 1 the sprocket collar 30 can easily be slidably inserted onto the hub 20 (FIG. 3). Likewise, the sprocket collar 30 can be slidably removed from the hub 20 if for example the teeth are worn or damaged, and a replacement sprocket collar 30 can be inserted onto the hub 20.

The recesses 25 and the protrusions 35 are configured for preventing radial movement between the hub 20 and the sprocket collar 30. The protrusions 35 each comprises a head 351 and a neck 352, and the neck 352 is smaller than the head 351 (FIG. 3). The recesses 25 envelop protrusions 35 and thus preventing radial movement between the sprocket collar 30 and the hub 20. Other designs of the protrusions 35 and the corresponding recesses 25 can used for preventing radial and tangential movement, known to those skilled in the art.

The sprocket collar 30 comprises a split 32 extending radially from the inner surface 31 to the peripheral surface 39 (FIG. 2). The sprocket collar 30 is made of the flexible material such as, but not limited to, polyurethane or polyethylene. The split 32 can therefore be widened by pulling at the two sides of the split 32. The split 32 can also be widened by pulling the two sides of the split 32 in opposite axial directions. By expanding the split 32, the sprocket collar 30 can be brought onto the shaft 40 or removed from the shaft 40 without sliding the sprocket collar 30 on and off an end of the shaft 40.

The sprocket collar 30 is provided with a plurality of teeth 38 on the peripheral surface 39. The teeth 38 may engage with corresponding engagement means on for example a conveyor belt (not shown) to transfer rotational movement to the conveyor belt. The sprocket collar 30 may also comprise engagement means other than teeth 38.

The sprocket assembly 1 further comprises an alignment means 50 for preventing axial movement between the hub 20 and the sprocket collar 30. In the figures, the alignment means comprises a set of disks 50, mounted on each side of the hub 20 and the sprocket collar 30 (FIG. 1 and FIG. 2). The disks 50 are aligned with the hub 20 so that the holes 501 of the disks 50 are aligned with the complementary holes 201 of the hub 20. The disks 50 are fastened with the hub 20 with bolts 602 and nuts 603. The disks 50 cover an inner part of the sprocket collar 30, thus restricting the axial movement of the sprocket collar 30 when the disks 50 are tightly fastened to the hub 20.

The sprocket collar 30 is also provided with holes 301 so that the disks 50 can be fastened to the sprocket collar 30 with bolts 602 and nuts 603. The disks 50 can be fastened to only the sprocket collar 30 to restrict the axial movement of the hub 20.

The hub 20 may also have threaded holes so that the disks 50 could be fastened directly to the hub 20 using bolts and nuts.

One disk 50 or a set of disks 50 can also be fastened to both the sprocket collar 30 and the hub 20, for preventing relative movement in both the axial and the radial direction between the hub 20 and the sprocket collar 30.

Two discs 50 arranged on either side of the hub 20 and the sprocket collar 30 can also be fastened to each other, so the discs 50 are clamping the hub 20 and the sprocket collar 30.

In one embodiment the disk 50 comprises a split extending radially across the disk, dividing the disk into two disc portions (not shown).

The particular embodiments disclosed above are illustrative only, as the invention may be modified and practiced in different but equivalent manners apparent to those skilled in the art having the benefit of the teachings herein.

For example, the hub 20 can be fastened onto the shaft 40 by locking means other than the groove 27 on the hub 20 and the complementary wedge 47 on the shaft 40. The hub 20 could be welded onto the shaft 40. A person skilled in the art would also find alternative designs of the groove 27 and the wedge 47 for also preventing axial movement between the hub 20 and the shaft 40.

Alternative alignment means, other than the ones described above, can be used to precent axial movement between the hub 20 and the sprocket collar 30. The disks 50 may not cover the whole hub 20. It may be separated into smaller plates that are connected to parts of the hub 20 and the sprocket collar 30. The sprocket collar 30 and the hub 20 may also be configured to be screwed directly together.

The person skilled in the art may easily find alternative solutions for the sprocket assembly. The invention covers all these variants as long as they are covered by the independent claims. No limitations are intended to the details of construction or design herein shown, other than as described in the claims below. It is therefore evident that the particular embodiments disclosed above may be altered or modified and all such variations are considered within the scope of the invention. Accordingly, the protection sought herein is as set forth in the claims below.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The mere fact that certain measures are recited in mutually different dependent claims does not indicate that a combination of these measures cannot be used to advantage. The invention may be implemented by means of hardware comprising several distinct elements, and by means of a suitably programmed computer. In the device claims enumerating several means, several of these means may be embodied by one and the same item of hardware.

The invention claimed is:

1. A sprocket assembly comprising:
   a hub adapted to be mounted on a shaft;
   a sprocket collar comprising a peripheral surface and an inner surface,
   wherein the sprocket collar being releasably interlocked with the hub,
   wherein the sprocket collar comprises a split extending between the inner surface and the peripheral surface, and
   wherein the sprocket collar is in one piece and made of a flexible material so that the split is widenable by pulling two sides of the split.

2. The sprocket assembly according to claim 1, further comprising an alignment means for preventing axial movement between the hub (20) and the sprocket collar.

3. The sprocket assembly according to claim 2, wherein the alignment means comprises at least one disk adapted to be mounted on the shaft, the at least one disk being releasably connectable to the hub and the sprocket collar.

4. The sprocket assembly according to claim 3, wherein the at least one disk comprises at least two disc portions.

5. The sprocket assembly according to claim 1, further comprising mating engagement means configured for radially interlocking the hub with the sprocket collar.

6. The sprocket assembly according to claim 5, wherein one of the hub and the sprocket collar is provided with at least one recess and the other one of the hub and the sprocket collar is provided with at least one protrusion, the at least one protrusion being complementary to the at least one recess, the at least one protrusion comprising a neck and a head, wherein the neck is smaller than the head.

7. The sprocket assembly according to claim 1, wherein the peripheral surface of the sprocket collar comprises a plurality of teeth.

8. The sprocket assembly according to claim 1, wherein the hub comprises locking means for engaging complementary locking means of the shaft.

9. A method for assembling or replacing a sprocket assembly, the method comprising the steps:
   a) providing a sprocket assembly in accordance with claim 1;
   b) mounting the hub on a shaft;
   c) expanding the split in the sprocket collar;
   d) bringing the sprocket collar onto the shaft; and
   e) interlocking the sprocket collar with the hub.

10. The method according to claim 9, further comprising the steps:
    f) releasing the sprocket collar from the hub;
    g) re-expanding the split in the sprocket collar; and
    h) bringing the sprocket collar away from the shaft.

11. The method according to claim 10, further comprising providing a replacement sprocket collar and repeating step c) to e).

12. The method according to claim 9, further comprising bringing alignment means into interlocking abutment against at least a portion of the hub and at least a portion of the sprocket collar.

13. The method according to claim 12, comprising Interlocking the alignment means by securing the alignment means to the hub and to the sprocket collar.

14. The method according to claim 12, comprising clamping the hub and the sprocket collar between alignment means arranged on either side of the hub and the sprocket collar.

15. The method according to claim 9, further comprising engaging a locking means of the hub with a complementary locking means of the shaft.

16. The method according to claim 11, further comprising bringing alignment means into interlocking abutment against at least a portion of the hub and at least a portion of the sprocket collar.

17. The method according to claim 13, comprising clamping the hub and the sprocket collar between alignment means arranged on either side of the hub and the sprocket collar.

* * * * *